(12) United States Patent
Rivaud et al.

(10) Patent No.: US 11,276,955 B2
(45) Date of Patent: Mar. 15, 2022

(54) DOUBLE-BLIND MATING PLUGGABLE-MODULES HOLDER

(71) Applicant: Ciena Corporation, Hanover, MD (US)

(72) Inventors: Daniel Rivaud, Ottawa (CA); Anthony Mayenburg, Carp (CA); Fabien Colton, Kars (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/734,529

(22) Filed: Jan. 6, 2020

(65) Prior Publication Data
US 2021/0210894 A1 Jul. 8, 2021

(51) Int. Cl.
*H01R 13/518* (2006.01)
*H01R 43/26* (2006.01)

(52) U.S. Cl.
CPC .......... *H01R 13/518* (2013.01); *H01R 43/26* (2013.01)

(58) Field of Classification Search
CPC .............................. H01R 13/518; H01R 43/26
USPC ...................................................... 439/540.1
See application file for complete search history.

(56) References Cited

U.S. PATENT DOCUMENTS

| | | | | |
|---|---|---|---|---|
| 3,997,234 A * | 12/1976 | Worman | ............ | H01R 13/6335 439/456 |
| 4,179,172 A * | 12/1979 | Godsey | ................ | H05K 7/1439 361/785 |
| 4,399,484 A * | 8/1983 | Mayer | ................ | H05K 7/20345 165/908 |
| 5,184,961 A * | 2/1993 | Ramirez | ................ | H01R 13/74 439/59 |
| 5,513,995 A * | 5/1996 | Kurotori | ................ | H01R 24/52 439/564 |
| 5,545,057 A * | 8/1996 | Tan | ....................... | H05K 7/1439 439/540.1 |
| 6,038,426 A * | 3/2000 | Williams, Jr. | ..... | B64D 11/0015 725/77 |
| 6,123,564 A * | 9/2000 | Belmore, III | ........ | H01R 13/518 324/538 |
| 6,174,206 B1 * | 1/2001 | Yentile | ................ | H01R 24/542 439/578 |
| 6,256,881 B1 * | 7/2001 | Starkey | ............... | B29C 33/0083 29/856 |
| 6,305,848 B1 * | 10/2001 | Gregory | ............... | G02B 6/4246 385/134 |
| 6,623,177 B1 * | 9/2003 | Chilton | ................... | G02B 6/43 385/134 |
| 6,943,527 B2 * | 9/2005 | Liu | ....................... | G06F 1/1616 320/107 |
| 6,948,968 B1 | 9/2005 | Shearman et al. | | |
| 6,984,073 B2 * | 1/2006 | Cox | ...................... | G02B 6/3897 385/55 |
| 8,154,867 B2 | 4/2012 | Shearman et al. | | |

(Continued)

*Primary Examiner* — Neil Abrams
(74) *Attorney, Agent, or Firm* — Clements Bernard Baratta; Lawrence A. Baratta, Jr.; Christopher L. Bernard

(57) ABSTRACT

A pluggable-modules holder for a plurality of pluggable-modules of a rack-mounted unit is disclosed. The pluggable-modules holder includes a holder body and a plurality of holder ports. Each of the holder ports extends through the holder body and is sized to hold a portion of a respective pluggable-module. The holder body can be configured to connect to a rack-mounted unit before and/or after the plurality of pluggable-modules can be inserted into the plurality of holder ports.

18 Claims, 13 Drawing Sheets

(56) References Cited

U.S. PATENT DOCUMENTS

| | | | | |
|---|---|---|---|---|
| 8,270,796 B2* | 9/2012 | Nhep | .................... | G02B 6/3897 |
| | | | | 385/135 |
| 8,322,933 B2* | 12/2012 | Sasaki | .................. | G02B 6/3897 |
| | | | | 385/89 |
| 8,382,515 B2* | 2/2013 | Caveney | .................. | H04Q 1/09 |
| | | | | 439/540.1 |
| 8,585,437 B2* | 11/2013 | Lin | ...................... | H01R 13/518 |
| | | | | 439/540.1 |
| 8,747,150 B1* | 6/2014 | Lin | .......................... | H04Q 1/13 |
| | | | | 439/540.1 |
| 9,203,782 B2 | 12/2015 | Mayenburg et al. | | |
| 9,645,317 B2* | 5/2017 | Isenhour | .............. | G02B 6/3849 |
| 9,722,381 B1* | 8/2017 | Moen | ................... | H05K 7/1491 |
| 9,825,408 B2* | 11/2017 | Henry | ................ | H01R 13/6596 |
| 10,012,811 B2 | 7/2018 | Rivaud et al. | | |
| 10,247,895 B2 | 4/2019 | Rivaud et al. | | |
| 10,425,360 B2 | 9/2019 | Estabrooks et al. | | |
| 10,490,952 B2* | 11/2019 | Briant | .................... | H01R 12/58 |
| 2005/0124180 A1 | 6/2005 | Simonovich et al. | | |
| 2006/0262492 A1* | 11/2006 | Tsai | ........................ | G06F 1/266 |
| | | | | 361/601 |
| 2017/0054259 A1* | 2/2017 | Tomada | ................. | H01R 43/26 |
| 2019/0327188 A1 | 10/2019 | Rivaud et al. | | |
| 2021/0092860 A1* | 3/2021 | Singla | .................... | H01R 31/06 |

\* cited by examiner

DOUBLE-BLIND MATING PLUGGABLE-MODULES HOLDER

FIELD OF THE DISCLOSURE

The present disclosure generally relates to networking equipment. More particularly, the present disclosure relates to systems and methods for mounting multiple pluggable-modules to rack-mounted units ("pizza boxes") via a pluggable-modules holder.

BACKGROUND OF THE DISCLOSURE

Large switches can be built with rack-mounted units, such as leaf-spine pizza boxes. Thousands of pluggable-modules, such as Quad Small Form-factor Pluggable transceivers ("QSFPs"), C Form-factor Pluggable transceivers ("CFPs"), and the like are used for leaf-spine fabric interconnect and client connections. The fabric or client pluggable-modules are currently inserted and removed one at a time. At a density of 36× pluggable-module per Rack Unit (RU), a full rack of 1RU rack-mounted units results in 1440 individual pluggable-modules that must be manually inserted and verified, which is a time-consuming and error-prone manual process. Furthermore, current solutions lack the ability to allow pluggable-modules to be used as a backplane, in a convenient and efficient manner.

BRIEF SUMMARY OF THE DISCLOSURE

In an embodiment, a pluggable-modules holder for a plurality of pluggable-modules includes a holder body; and a plurality of holder ports, each of the holder ports positioned along the holder body and sized to hold a portion of a respective pluggable-module. The holder body can be configured to connect to a rack-mounted unit before or after the plurality of pluggable-modules are inserted into the plurality of holder ports. The pluggable-modules holder can further include one or more retention features that restrain the plurality of pluggable-modules in at least a removal direction of the plurality of pluggable-modules when inserted into the plurality of holder ports, the one or more retention features including at least one of a protrusion in each of the holder ports, a depression in each of the holder ports, and an assembly of a retention rod extending across a length of the pluggable-modules holder, retention arms extending from the retention rod, and a retention switch that moves the retention rods and retention arms into a retention position such that the retention arms overlap with the plurality of holder ports.

Each of the holder ports can be shaped to hold a portion of a respective body of the respective pluggable-module. Each of the holder ports can be further shaped to hold at least a portion of a respective head of the respective pluggable-module. The pluggable-modules holder can further include an alignment feature including at least one of a rod and a bore that mates with a corresponding feature of a rack-mounted unit. The pluggable-modules holder can further include a plurality of cooling holes extending through the holder body. The pluggable-modules holder can further include electrical connectors for relaying at least one of control signals and power from a rack-mounted unit to a fan module. The plurality of holder ports can be spaced such that the pluggable-modules holder is configured to hold pluggable-modules held by multiple rack-mounted units.

In another embodiment, a module assembly includes a plurality of pluggable-modules; a rack-mounted unit including a plurality of unit ports that receive the plurality of pluggable-modules; and a pluggable-modules holder including a holder body and a plurality of holder ports, each of the holder ports positioned along the holder body, positioned in the holder body to align with a respective unit port, and sized to hold a portion of a respective pluggable-module. The holder body can be configured to connect to the rack-mounted unit before or after the plurality of pluggable-modules are inserted into the plurality of holder ports. The module assembly can further include alignment features including a rod and a bore that align the pluggable-modules holder relative to the rack-mounted unit such that the plurality of holder ports aligns with the plurality of unit ports.

The pluggable-modules holder can further include one or more retention features that restrain the plurality of pluggable-modules in at least a removal direction of the plurality of pluggable-modules when inserted into the plurality of holder ports, the one or more retention features including at least one of a protrusion in each of the holder ports, a depression in each of the holder ports, and an assembly of a retention rod extending across a length of the pluggable-modules holder, retention arms extending from the retention rod, and a retention switch that moves the retention rods and retention arms into a retention position such that the retention arms overlap with the plurality of holder ports. The module assembly can further include a fan module, and wherein the pluggable-modules holder can include electrical connectors for relaying at least one of control signals and power from the rack-mounted unit to the fan module. The pluggable-modules holder can further include cooling holes extending through the holder body such that cooling air blown by the fan module passes therethrough.

In a further embodiment, a method for assembling a module assembly includes providing a pluggable-modules holder including a holder body, and a plurality of holder ports, each of the holder ports positioned along the holder body and sized to hold a portion of a respective pluggable-module; inserting a plurality of pluggable-modules into the plurality of holder ports such that each of the plurality of pluggable-modules is received by a respective holder port; and connecting the pluggable-modules holder to a rack-mounted unit such that the plurality of holder ports each align with a respective one of a plurality of unit ports of the rack-mounted unit, wherein each of the plurality of pluggable-modules mate with a respective unit port. The pluggable-modules holder can be connected to the rack-mounted unit before the plurality of pluggable-modules are inserted into the plurality of holder ports.

The pluggable-modules holder can be connected to the rack-mounted unit after the plurality of pluggable-modules are inserted into the plurality of holder ports such that the plurality of pluggable-modules mate with the plurality of unit ports simultaneously while the pluggable-modules holder is being connected to the rack-mounted unit. The pluggable-modules holder can be connected to the rack-mounted unit via a carrier mounted to a shelf of a rack. The pluggable-modules holder can be connected to the rack prior to being connected to the rack-mounted unit such that the pluggable-modules holder is a backplane for an assembly of the pluggable-modules holder, the rack-mounted unit, and the pluggable-modules.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a cross-sectional diagram of the module assembly of FIG. 1 in a first mating option of the module assembly;

FIG. 9 is a cross-sectional diagram of the module assembly of FIG. 1 in a second mating option of the module assembly;

FIG. 10 is a cross-sectional diagram of the module assembly of FIG. 1 in a third mating option of the module assembly;

FIGS. 11-13 are perspective diagrams of the module assembly of FIG. 1 in a fourth mating option of the module assembly;

FIG. 14 is a cross-sectional diagram of the module assembly of FIG. 1 in the fourth mating option of the module assembly;

FIG. 15 is a perspective diagram of the module assembly of FIG. 1 in the third mating option of the module assembly;

FIG. 16 is a cross-sectional diagram of the module assembly of FIG. 1 in the third mating option of the module assembly;

FIG. 17 is a cross-sectional diagram of the module assembly of FIG. 1 in the second mating option of the module assembly;

FIG. 23 is a perspective diagram of the pluggable-modules holder of FIG. 1 in the fifth mating option in a horizontal configuration;

FIG. 24 is a perspective diagram of the pluggable-modules holder of FIG. 1 in the fifth mating option in a vertical configuration;

FIG. 25 is a perspective diagram of the pluggable-modules holder of FIG. 23 holding pluggable-modules in a horizontal configuration;

FIG. 26 is a perspective diagram of the pluggable-modules holder of FIG. 24 holding pluggable-modules in a vertical configuration; and FIG. 27 is a perspective diagram of the module assembly including pluggable-modules holders of FIGS. 23-26 in the horizontal and vertical configurations.

DETAILED DESCRIPTION OF THE DISCLOSURE

In various embodiments, the present disclosure relates to systems and methods for networking equipment, and more particularly to systems and methods for mounting multiple pluggable-modules to a rack-mounted unit, and vice versa, via a pluggable-modules holder. Holder ports of the pluggable-modules holder retain the pluggable-modules in such a manner that the pluggable-modules are also retained in unit ports of the rack-mounted unit with connections to the electrical connectors within the unit ports.

The pluggable-modules holder has a double blind-mate feature allowing the assembly order of the pluggable-modules holder, the rack-mounted unit, and the pluggable-modules to vary with the same hardware allowing for various mating options and configurations of the assembly. These mating options include the pluggable-modules being pre-inserted into the pluggable-modules holder, which allows all the pluggable-modules to be inserted into the rack-mounted unit simultaneously.

Furthermore, the pluggable-modules holder, such as with the pluggable-modules pre-inserted, can act as a backplane where the rack-mounted unit is later mounted on the shelf in such a manner that the pluggable-modules are mated with the unit ports of the rack-mounted unit simultaneously. That is, the pluggable-modules holder can be installed and equipped with pluggable-modules that are not mated with a corresponding rack-mounted unit. Here, the installed pluggable-modules holder functions as a backplane.

As described herein, a rack-mounted unit may include a so-called pizza box which is a 1-2 RU (or more) integrated shelf. Other embodiments are also contemplated such as chassis or shelves which may also be rack-mounted and which may support removable modules.

Figure 1:
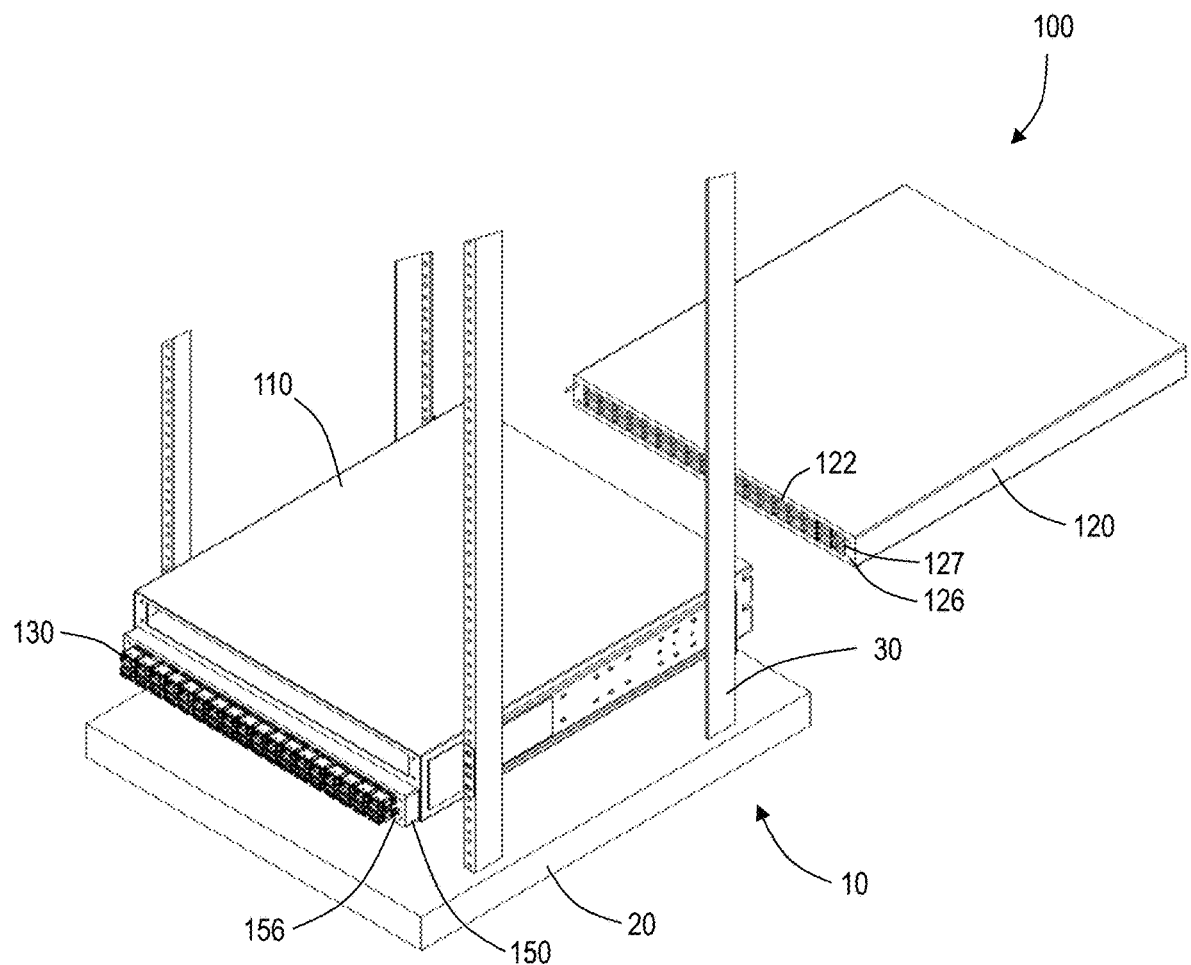
FIG. 1 is a perspective diagram of a partially exploded module assembly on a rack.

FIG. 1 is a perspective diagram of a partially exploded module assembly 100 on a rack 10. As can be seen in FIG. 1, the module assembly 100 can include a carrier 110, a rack-mounted unit 120, a pluggable-modules holder 150, and a pluggable-modules 130. The carrier 110 can receive the rack-mounted unit 120 therein, where the rack-mounted unit 120 is inserted into the carrier at one end. The carrier 110 can provide for attachment of the rack-mounted unit 120 and the pluggable-modules holder 150 to the rack 10. Alternatively, the rack-mounted unit 120 and the pluggable-modules holder 150 can be attached directly to the rack 10, such as to the shelf 20 of the rack 10. The pluggable-modules holder 150 can attach to the carrier 110 at an opposite end of the carrier 110 and can assemble and/or align with the rack-mounted unit 120.

The rack-mounted unit 120 can include unit ports 122 that can each receive a pluggable-module 130 to facilitate client connections and fabric interconnections. The rack-mounted unit 120 can also include alignment features 127 for aligning the unit ports 122 with the holder ports 154 of the pluggable-modules holder 150 (refer to FIGS. 2-7). The alignment features 127 can be rods, bores, and the like for aligning multiple components. The rack-mounted unit 120 can further include fasters 126, such as screws, bolts, nuts, and screw holes for attaching the rack-mounted unit 120 to the carrier 110 and/or the pluggable-modules holder 150.

The pluggable-modules 130 can be Quad Small Form-factor Pluggable transceivers ("QSFPs"), and that like, that are used for connections, such as leaf-spine fabric interconnections and client connections. Other types of pluggable-modules are also contemplated such as CFP, Octal Small Form-factor Pluggable (OSFP), and the like. Further, the pluggable-modules can be variants of these types such as QSFP28, CFP2, CFP4, etc.

Figure 2:
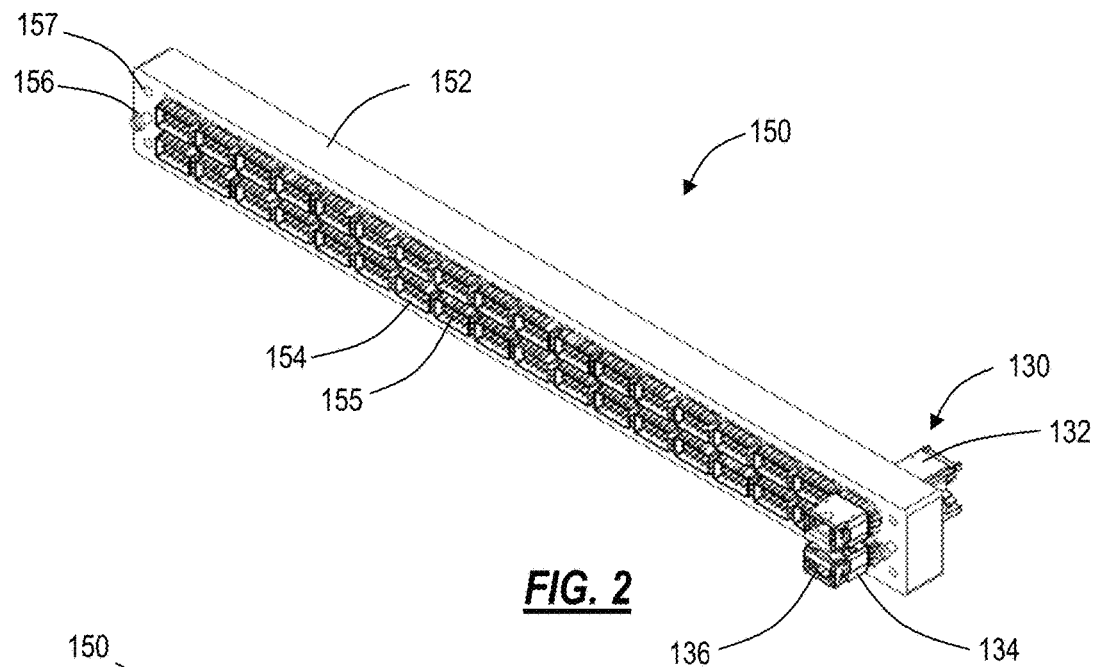
FIG. 2 is a perspective diagram of a pluggable-modules holder of FIG. 1.
Figure 3:
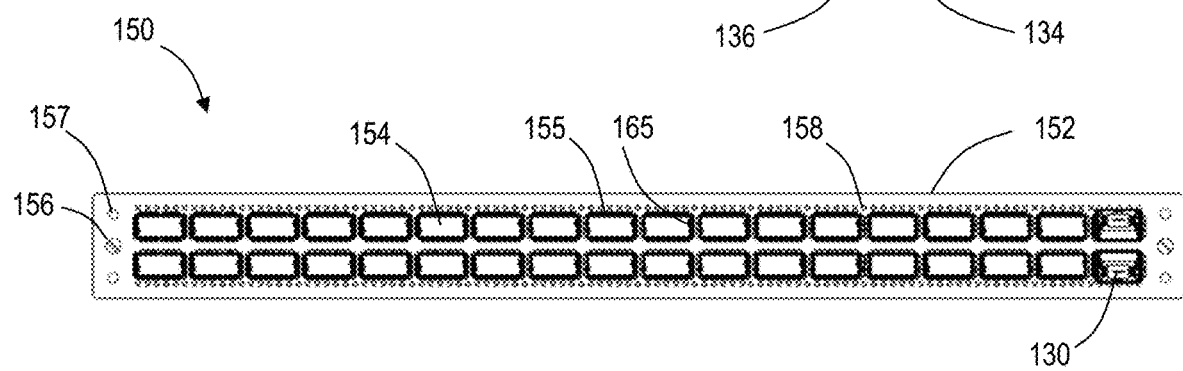
FIG. 3 is a front perspective diagram of the pluggable-modules holder of FIG. 2.
Figure 4:
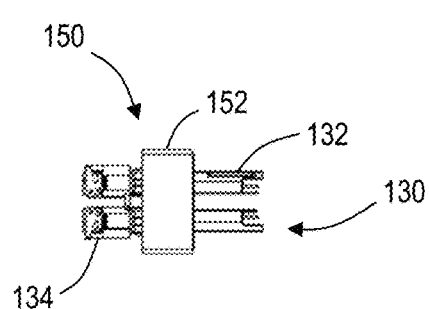
FIG. 4 is a side perspective diagram of the pluggable-modules holder of FIGS. 2 and 3.
Figure 5:
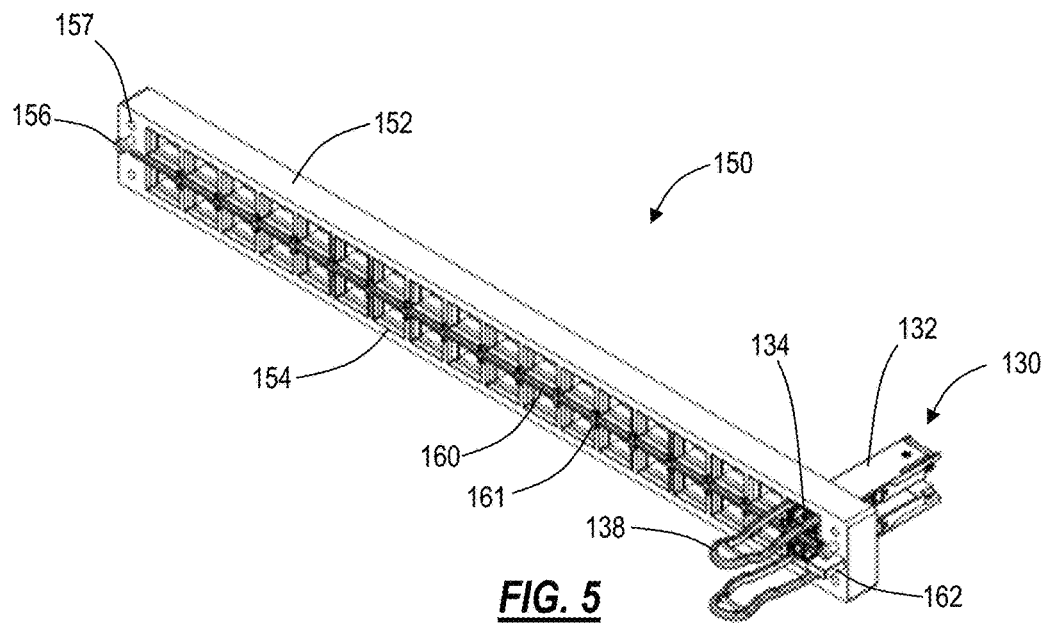
FIG. 5 is a perspective diagram of a pluggable-modules holder of FIG. 1.
Figure 6:
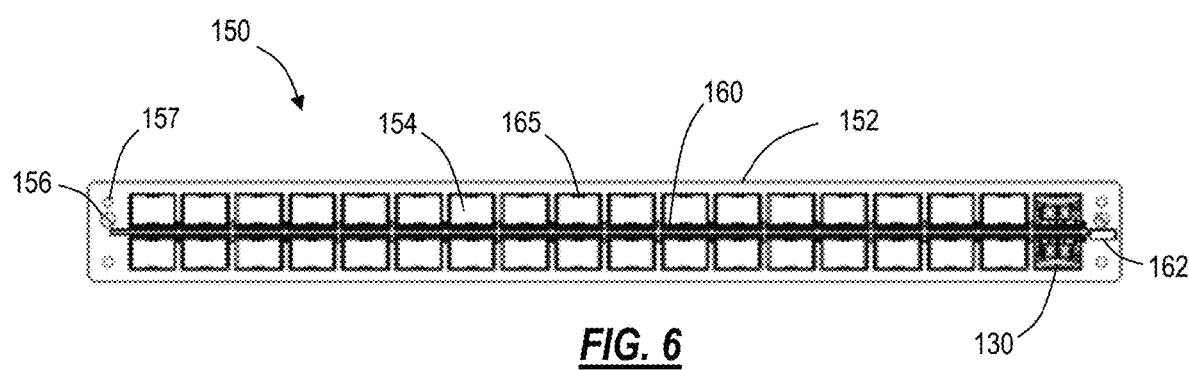
FIG. 6 is a front perspective diagram of the pluggable-modules holder of FIG. 5.
Figure 7:
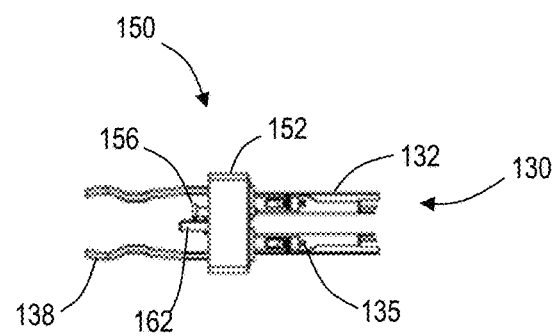
FIG. 7 is a side perspective diagram of the pluggable-modules holder of FIGS. 5 and 6.

FIG. 2 is a perspective diagram of a pluggable-modules holder 150 of FIG. 1, FIG. 3 is a front perspective diagram of the pluggable-modules holder 150 of FIG. 2, FIG. 4 is a side perspective diagram of the pluggable-modules holder 150 of FIGS. 2 and 3, FIG. 5 is a perspective diagram of a pluggable-modules holder 150 of FIG. 1, FIG. 6 is a front perspective diagram of the pluggable-modules holder 150 of FIG. 5, and FIG. 7 is a side perspective diagram of the pluggable-modules holder 150 of FIGS. 5 and 6.

As can be seen in FIGS. 2-7, each pluggable-module 130 can include a body 132, a head 134, and a receptor 136. The receptor 136 can receive a cable, and the body 132 can be received by one of the unit ports 122 for facilitating the client connections/fabric interconnections via the rack-mounted unit 120.

The pluggable-modules holder 150 can include a holder body 152, multiple holder ports 154, fasteners 156, alignment features 157, and cooling holes 158. The holder body 152 can be one or more rack units high and can extend a full width of the rack-mounted unit 120 or can extend a partial width of the rack-mounted unit 120. As such, one or more pluggable-modules holders 150 can be used with a single rack-mounted unit 120.

The multiple holder ports 154 can be positioned along the holder body 152. Each holder port 154 can include electromagnetic interference (EMI) shielding 155 and can be sized to hold the body 132 of a pluggable-module 130 (see FIGS. 2-4), the head 134 of a pluggable-module 130 (see FIGS. 5-7), or a combination thereof.

The fasteners 156 can fasten the pluggable-modules holder 150 to one or more of the carrier 110, the rack 10, and the rack-mounted unit 120. The alignment features 157 can be mated with the alignment features 127 of the rack-mounted unit 120, such as a bore for receiving a rod of rack-mounted unit 120, a rod to be received in a bore of the rack-mounted unit 120, and the like. The alignment features 127 and 157 can ensure that each holder port 154 aligns with a corresponding unit port 122.

The pluggable-modules holder 150 can include retaining features for retaining each pluggable-module 130 in a respective holder port 154. The retaining features are configured to prevent movement of each pluggable-module 130 in a removal direction and/or in an insertion direction.

As can be seen in FIGS. 2-4, each holder port 154 can include a feature 165 that can be a protrusion or a depression that mates with a protrusion or depression of the body 132 of pluggable-module 130. Furthermore, the holder port 154 can be sized to form an interference fit with the body 132 for retention of the pluggable-modules 130. Other means of retention at the body 132 of the pluggable-modules 130 are also contemplated.

Figure 8:
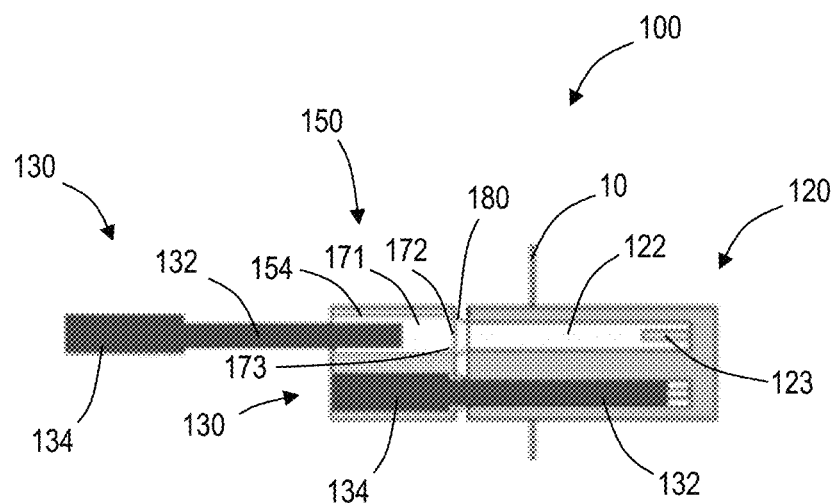
FIGS. 8-17 are diagrams of the module assembly of FIG. 1 in various mating options of the module assembly.

As can be seen in FIGS. 5-7, each holder port 154 can include a feature 165 that can be a protrusion or a depression that mates with a protrusion or depression of the head 134 of pluggable-module 130, such as a hole in a QSFP. Furthermore, the holder port 154 can be sized to form an interference fit with the head 134 for retention of the pluggable-modules 130. As shown in FIGS. 6-8, the pluggable-modules 130 can each include a pull-tab 138 to facilitate removal of the pluggable-modules 130 from the holder ports 154.

Other means of retention at the head 134 of the pluggable-modules 130 are also contemplated. For example, the pluggable-modules holder 150 can include a retention rod 160, retention arms 161 and a retention switch 162. The retention rod 160 can extend across the face of the pluggable-modules holder 150 with the retention arms 161 extending therefrom. The retention switch 162 can move the retention rod 160 such that the retention arms 161 move to and from a retention position. In the retention position, the retention arms 161 protrude over the heads 134 of the pluggable-modules 130 to prevent removal/movement of the pluggable-modules 130. In a non-retention position, the retention arms 161 can be positioned between holder ports 154.

Due to the configuration of the pluggable-modules holder 150 the mating between the pluggable-modules holder 150, the rack-mounted unit 120, and the pluggable-modules 130 is double blind. Thus, the pluggable-modules holder 150 with pluggable-modules 130 can be pre-attached to an empty rack 10 followed by insertion of the rack-mounted unit 120, the rack-mounted unit 120 can be pre-attached to an empty rack 10 followed by insertion of the pluggable modules 130 into the rack-mounted unit 120, and variations thereof. As such, the pluggable-modules holder 150 with the pluggable modules 130 or the rack-mounted unit 120 can be used as a backplane of the assembly. The various mating options are illustrated further in FIGS. 8-17, which are described in greater detail below.

Figure 9:
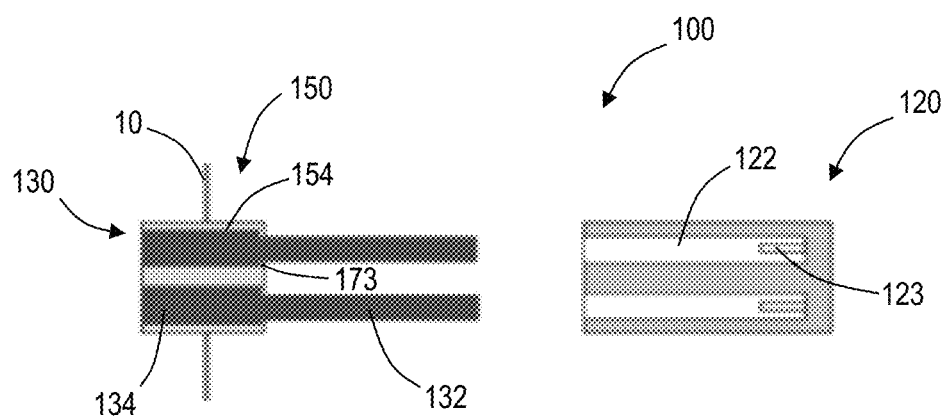
Figure 10:
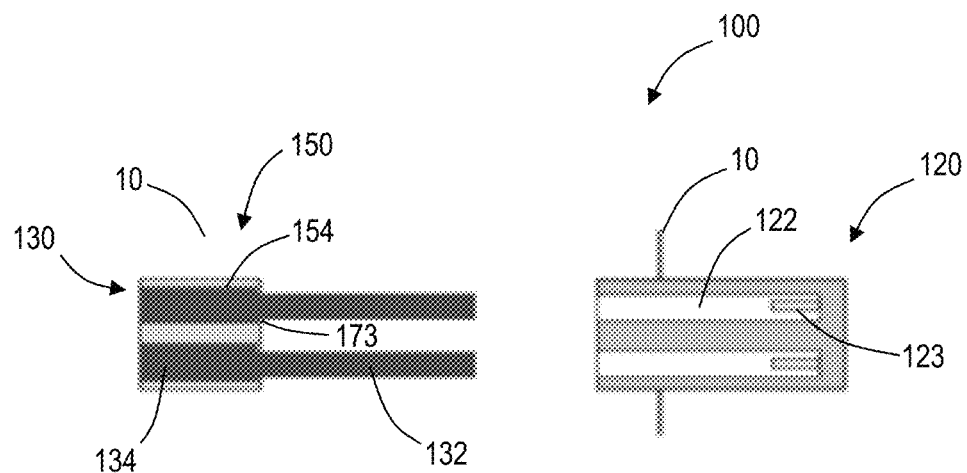
Figure 11:
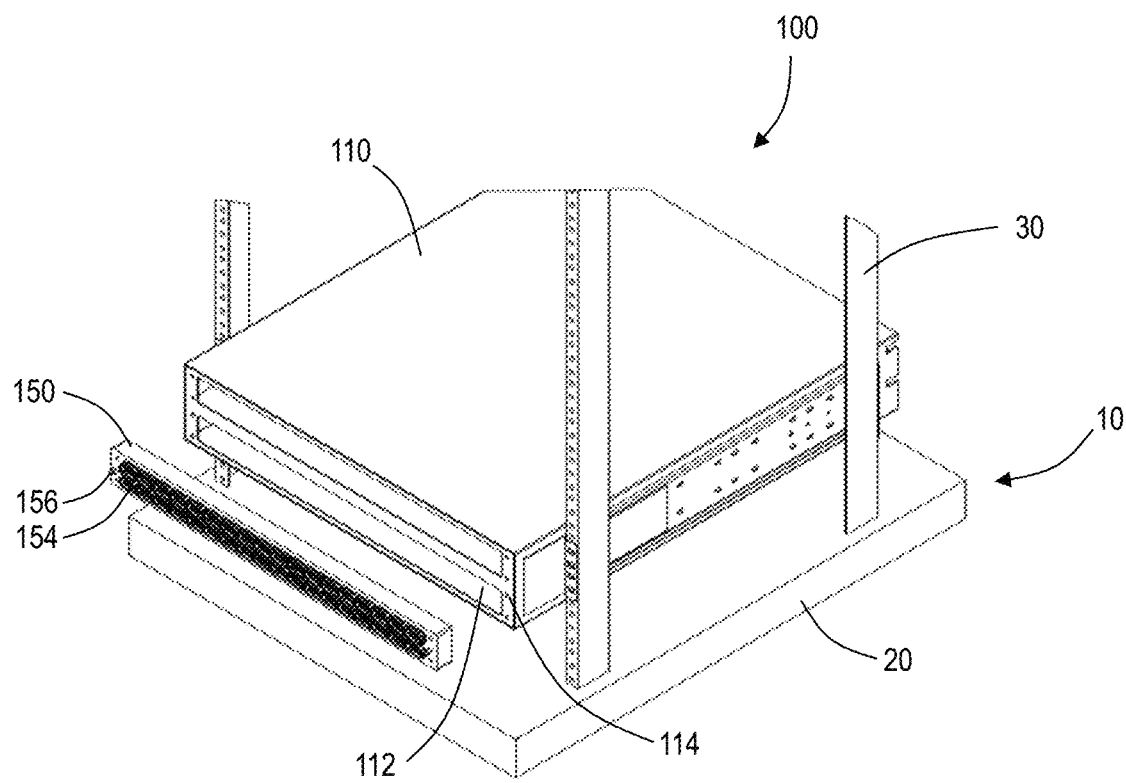
Figure 12:
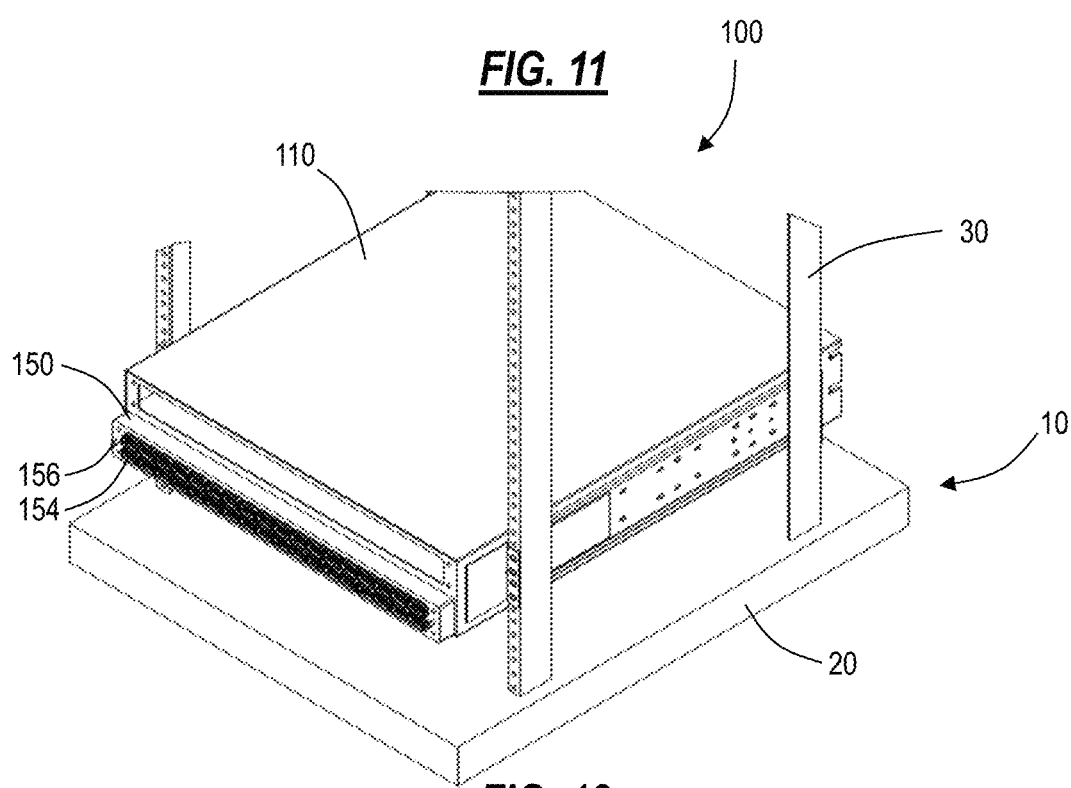
Figure 13:
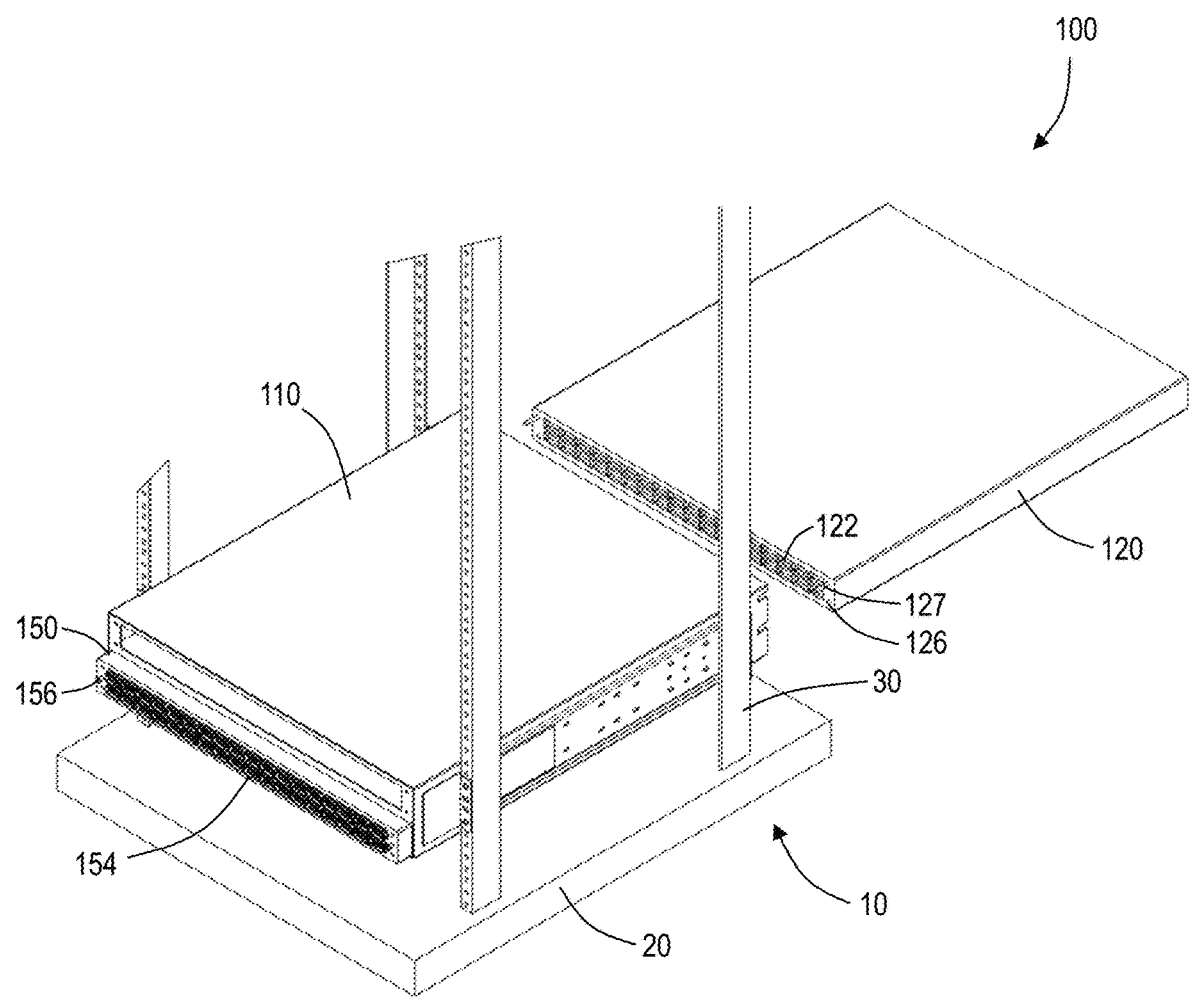
Figure 14:
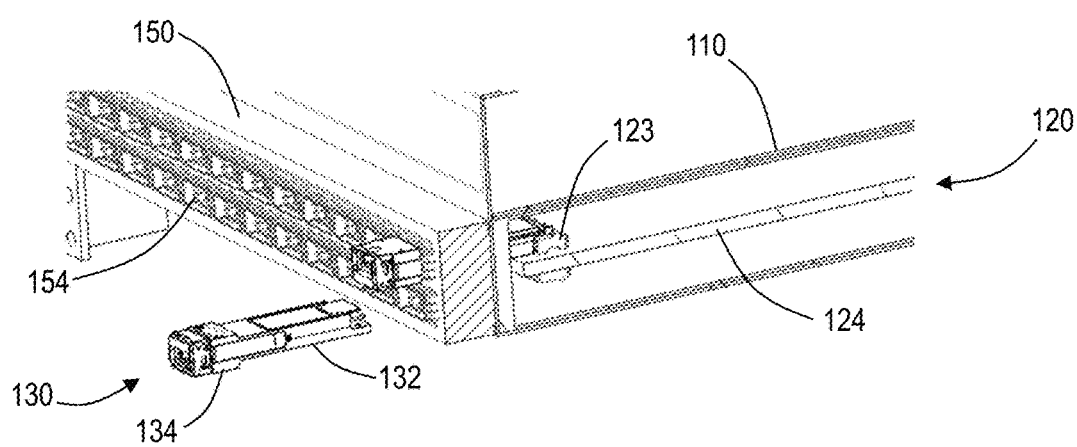
Figure 15:
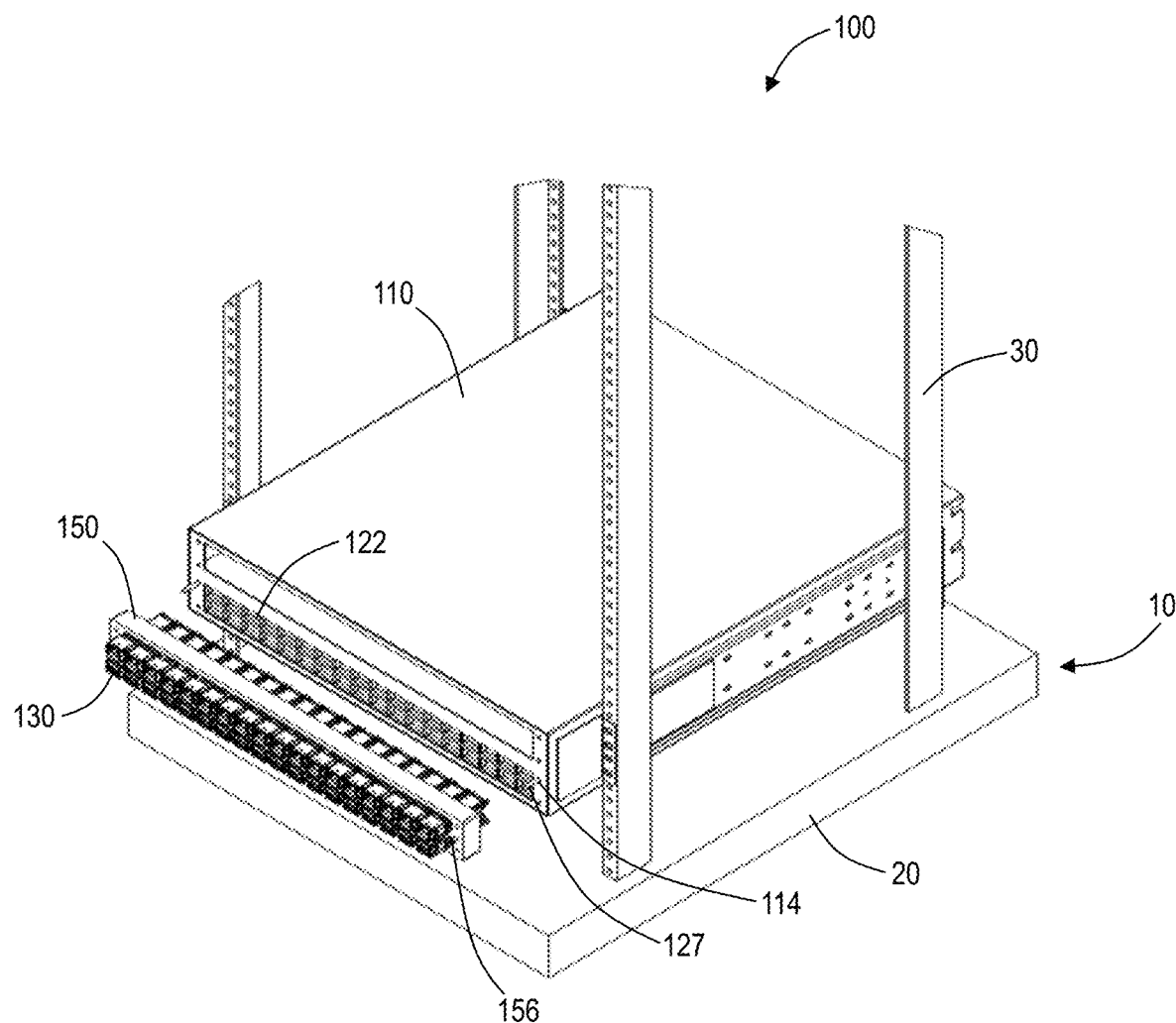
Figure 16:
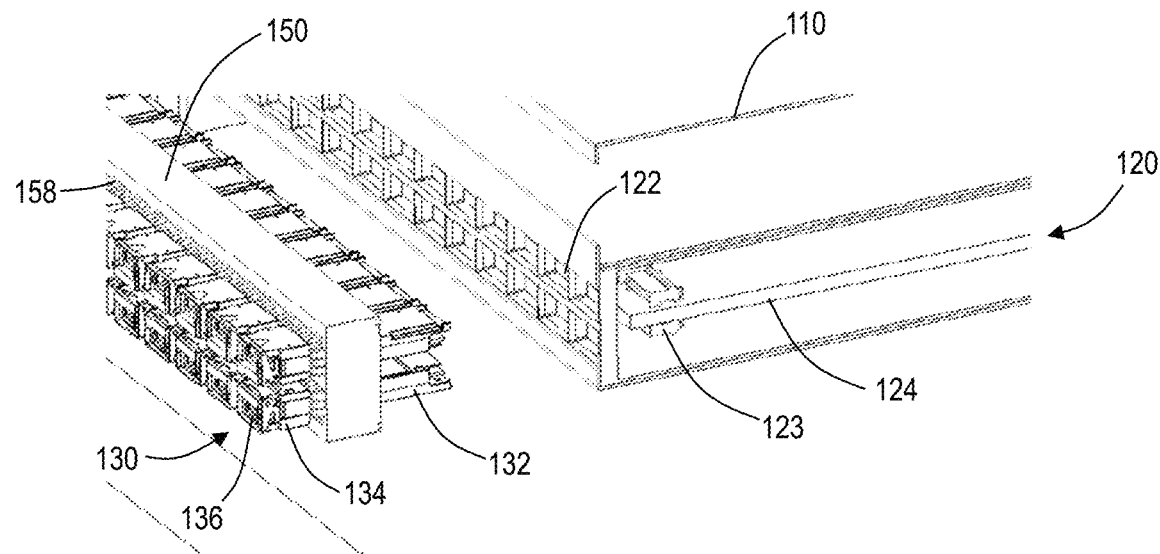
Figure 17:
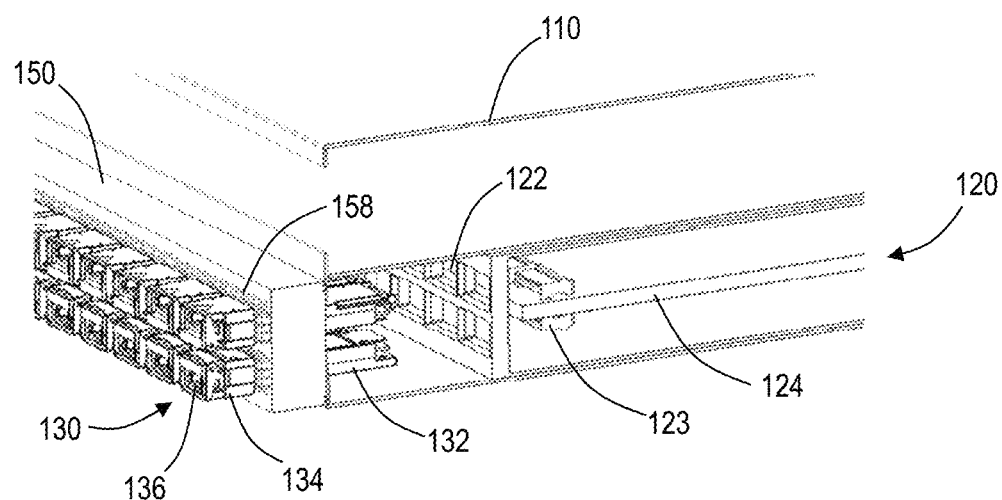

FIGS. 8-17 are diagrams of the module assembly 100 of FIG. 1 in various mating options of the module assembly 100. FIG. 8 is a cross-sectional diagram of the module assembly 100 of FIG. 1 in a first mating option of the module assembly 100. FIG. 9 is a cross-sectional diagram of the module assembly 100 of FIG. 1 in a second mating option of the module assembly 100. FIG. 10 is a cross-sectional diagram of the module assembly 100 of FIG. 1 in a third mating option of the module assembly 100. FIGS. 11-13 are perspective diagrams of the module assembly 100 of FIG. 1 in a fourth mating option of the module assembly 100. FIG. 14 is a cross-sectional diagram of the module assembly 100 of FIG. 1 in the fourth mating option of the module assembly 100. FIG. 15 is a perspective diagram of the module assembly 100 of FIG. 1 in the third mating option of the module assembly 100. FIG. 16 is a cross-sectional diagram of the module assembly 100 of FIG. 1 in the third mating option of the module assembly 100. FIG. 17 is a cross-sectional diagram of the module assembly 100 of FIG. 1 in the second mating option of the module assembly 100.

As noted above, multiple assembly/mating options are available utilizing the same hardware of the module assembly 100. As can be seen in FIG. 8, in a first mating option, the rack-mounted unit 120 can first be secured to the rack 10 and act as the backplane of the assembly and the pluggable-modules holder 150 can then be connected thereto. One or more pluggable-modules 130 can be inserted into corresponding holder ports 154 and unit ports 122 such that each pluggable module 130 engages an electrical connector 123 of the rack-mounted unit 120 positioned within a unit port 122.

As can be seen in FIG. 8, each holder port 154 can include a head slot 171, a body slot 172, and one or more back lips 173. The head slot 171 can be configured to hold all or a portion of a head 134 of a pluggable module 130 and can include retention features for retaining the head 134 as described above. The body slot 172 can extend partially across the pluggable-modules holder 150 when the head slot 171 is included or can extend completely across the pluggable-modules holder 150 when the pluggable-modules holder 150 is configured to hold the bodies 132 of the pluggable-modules 130. The one or more back lips 173 can extend so as to narrow the holder port 154 from a width of the head 134 to a width of the body 132 so as to obstruct the head 134 from passing through the holder ports 154 and to prevent further movement of the pluggable-modules 130 in an insertion direction after the pluggable-modules 130 are inserted therein.

The module assembly 100 can also include guides 180 that guide the pluggable-modules 130 into respective unit ports 122. The guides 180 can be positioned between the pluggable-modules holder 150 and rack-mounted unit 120 and can be integral to one of the pluggable-modules holder 150 and rack-mounted unit 120. The guides 180 can also be chamfers in the rack-mounted unit 120.

The module assembly 100 can also include one or more standoffs which maintain a predetermined distance between the pluggable-modules holder 150 and the rack-mounted unit 120. The one or more standoffs can be integral to the pluggable-modules holder 150, integral to the rack-mounted unit 120, part of the fasteners 156 and 126, the guides 180, part of the alignment features 157 and 127, built into a configuration of the carrier 110, or combinations thereof. The one or more standoffs can facilitate the flow of cooling air between the pluggable-modules holder 150 and the rack-mounted unit 120.

As can be seen in FIG. 9, in a second mating option, the pluggable-modules holder 150 can first be secured to the rack 10 and act as the backplane of the assembly. Alternatively, the pluggable-modules holder 150 can be part of the rack 10, such as being integral to the shelf 20 or carrier 110. The pluggable-modules be inserted into the pluggable-modules holder 150 before or after the pluggable-modules holder 150 is connected to the rack 10, but before the rack-mounted unit 120 is connected thereto. After which, the rack-mounted unit 120 can be connected to the pluggable-modules holder 150 while also causing each body 132 to be simultaneously inserted into respective unit ports 122.

As can be seen in FIG. 10, in a third mating option, the pluggable-modules are pre-inserted into the pluggable-modules holder 150 prior to connection of the pluggable-modules holder 150 to the rack-mounted unit 120 that is secured to the rack 10 and acting as a backplane for the assembly.

FIGS. 11-14 illustrates a fourth mating option using a carrier 110. As can be seen in FIGS. 11 and 12, the pluggable-modules holder 150 is secured to the carrier 110, such as via fasteners 114. The pluggable-modules holder 150 can be aligned with one or more openings 112 that allow the bodies 132 of the pluggable-modules 130 to pass therethrough.

As can be seen in FIGS. 13 and 14, after the pluggable-modules holder 150 is secured to the carrier 110, the rack-mounted unit 120 is then inserted into the carrier 110, after which one or more pluggable-modules 130 are inserted into corresponding holder ports 154 and unit ports 122 to electrically connect to corresponding electrical connectors 123, which can be mounted on a printed circuit board ("PCB") of the rack-mounted unit 120.

FIGS. 15 and 16 illustrate the third mating option when using a carrier 110. As can be seen in FIGS. 15 And 16, the rack-mounted unit 120 is first secured to the carrier 110, and thus, can act as a backplane for the assembly. The pluggable-modules holder 150 can then be secured to the carrier 110. As can be seen in FIGS. 15 and 16, the pluggable-modules 130 can be pre-inserted into the pluggable-modules holder 150 allowing all of the pluggable-modules 130 to be simultaneously inserted into respective unit ports 122 and coupled to respective electrical connectors 123 when connecting the pluggable-modules holder 150 to the carrier 110.

FIG. 17 illustrates the second mating option when using a carrier 110. As can be seen in FIG. 17, the pluggable-modules holder 150 can be secured to the carrier 110 with the pluggable-modules 130 inserted therein, and thus, can act as a backplane for the assembly. The pluggable-modules 130 can be inserted before or after the pluggable-modules holder 150 is secured to the carrier 110. The rack-mounted unit 120 can then be inserted into the carrier 120 such that the bodies 132 of the pluggable-modules 130 are simultaneously inserted into respective unit ports 122 and coupled to respective electrical connectors 123.

Figure 18:
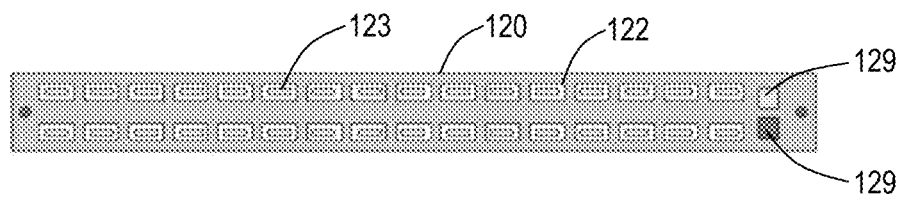
FIG. 18 is a front perspective of the rack-mounted unit of the module assembly of FIG. 1.
Figure 19:
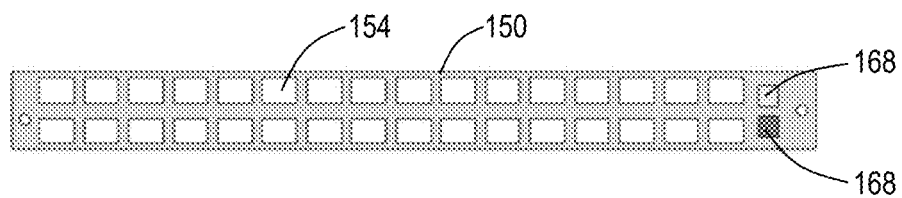
FIG. 19 is a front perspective of the pluggable-modules holder of the module assembly of FIG. 1.
Figure 20:
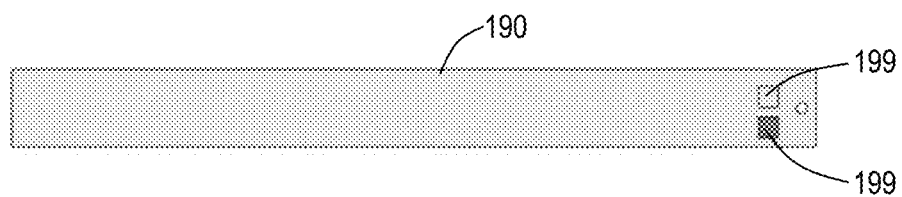
FIG. 20 is a front perspective of a fan module for the module assembly of FIG. 1.
Figure 21:
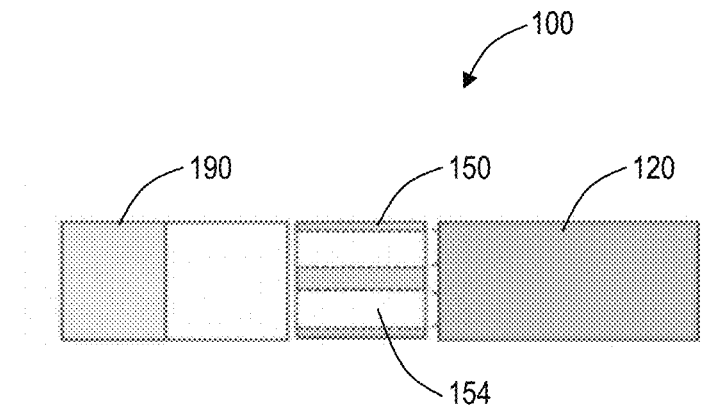
FIGS. 21-22 are cross-sectional diagrams of the module assembly of FIG. 1 with the fan module of FIG. 20.
Figure 22:
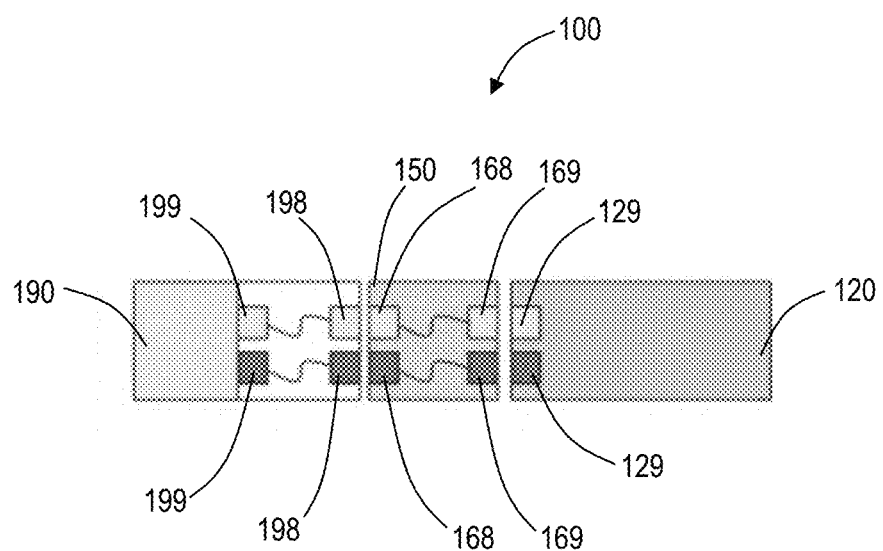

FIG. 18 is a front perspective of the rack-mounted unit 120 of the module assembly 100 of FIG. 1. FIG. 19 is a front perspective of the pluggable-modules holder 150 of the module assembly 100 of FIG. 1. FIG. 20 is a front perspective of a fan module 190 for the module assembly 100 of FIG. 1. FIGS. 21-22 are cross-sectional diagrams of the module assembly 100 of FIG. 1 with the fan module 190 of FIG. 20.

As can be seen in FIGS. 21 and 22, a fan module 190 can be positioned to provide cooling air to the module assembly 100, which can enter the module assembly 100 via cooling holes 158 (shown in FIGS. 2-7). The fan module 190 can include one or more electrical connectors 199 that connect to one or more electrical connectors 168 in a front face of the pluggable-modules holder 150, such as via one or more electrical connectors 198. The rack-mounted unit 120 can include one or more electrical connectors 129 that connect to one or more electrical connectors 169 in a back of the pluggable-modules holder 150. The electrical connectors 168 and 169 can relay electrical signals/power from the rack-mounted unit 120 to the fan module 190 for controlling fans of the fan module 190 and for supplying power to the fans of the fan module 190.

Figure 23:
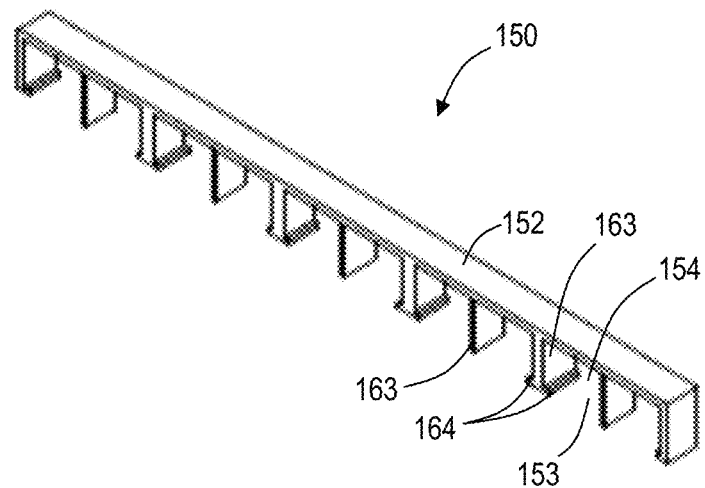
FIGS. 23-27 are perspective diagrams illustrating a fifth mating option of the pluggable-modules holder of FIG. 1.
Figure 24:
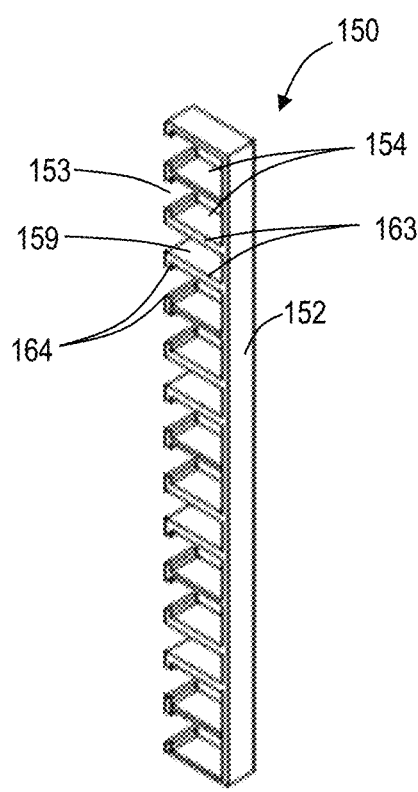
Figure 25:
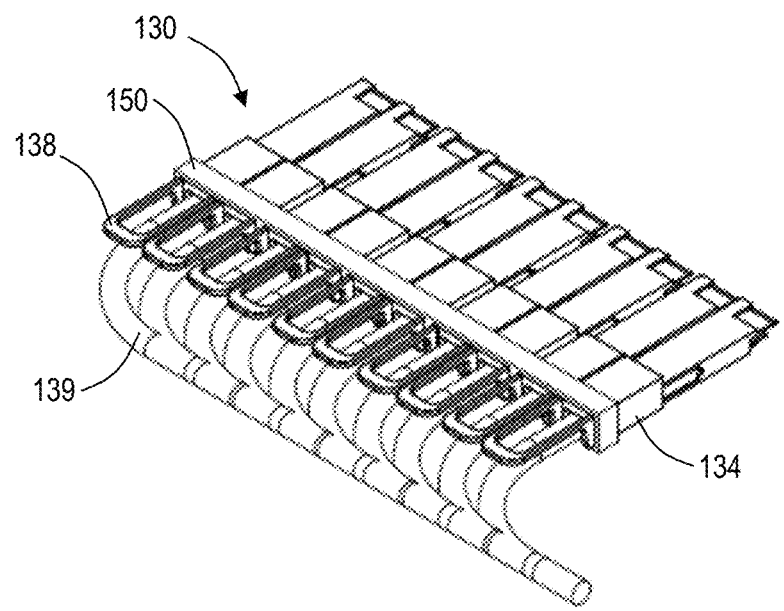
Figure 26:
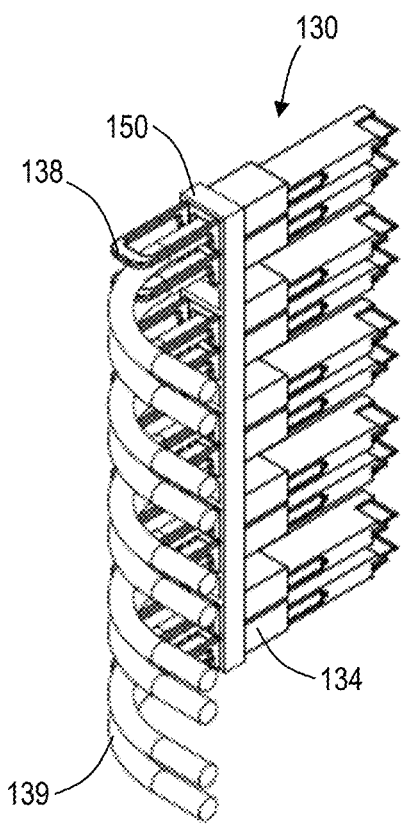
Figure 27:
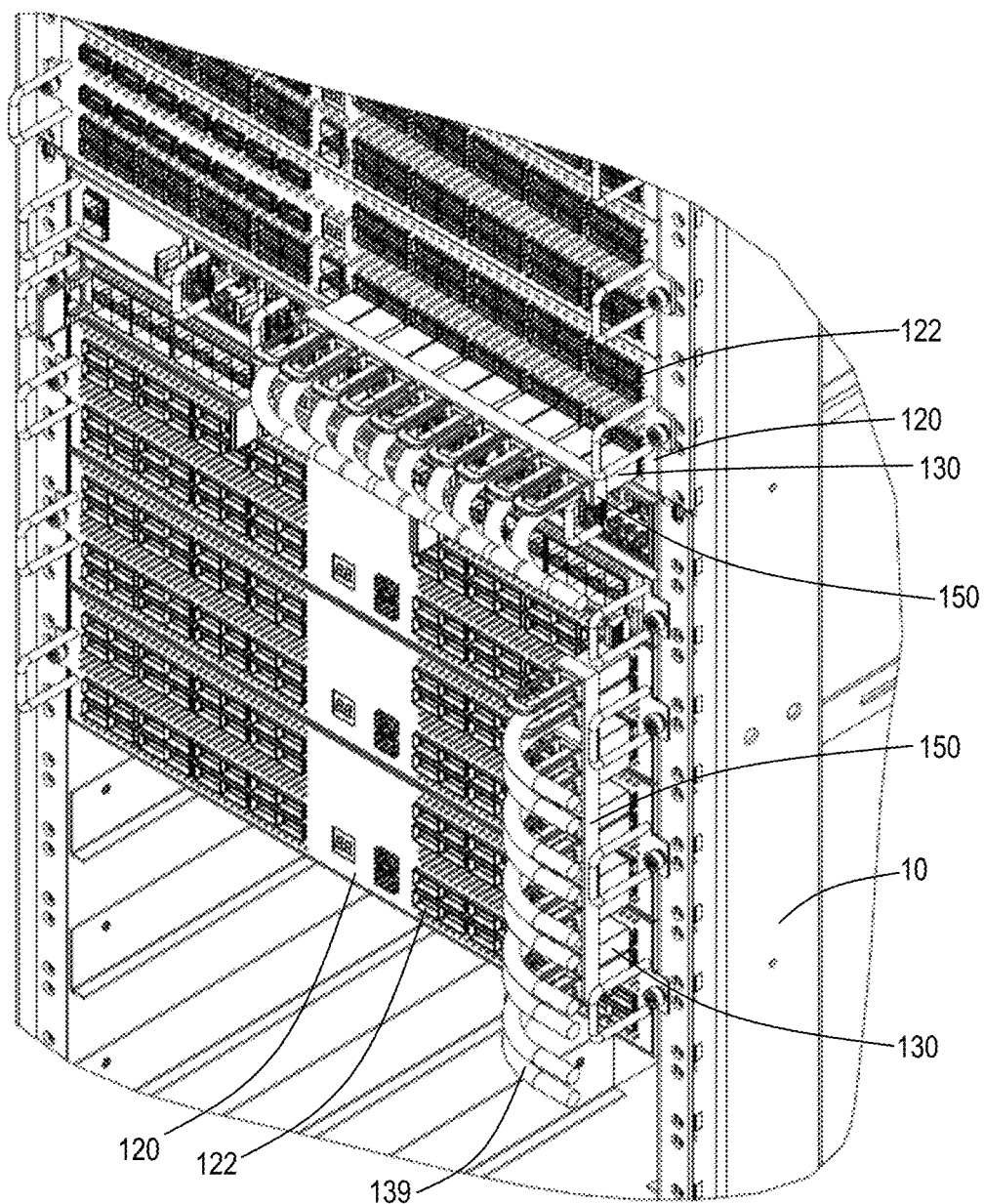

FIGS. 23-27 are perspective diagrams illustrating a fifth mating option of the pluggable-modules holder 150 of FIG. 1. FIG. 23 is a perspective diagram of the pluggable-modules holder 150 of FIG. 1 in the fifth mating option in a horizontal configuration. FIG. 24 is a perspective diagram of the pluggable-modules holder 150 of FIG. 1 in the fifth mating option in a vertical configuration. FIG. 25 is a perspective diagram of the pluggable-modules holder 150 of FIG. 23 holding pluggable-modules 130 in a horizontal configuration. FIG. 26 is a perspective diagram of the pluggable-modules holder 150 of FIG. 24 holding pluggable-modules 130 in a vertical configuration. FIG. 27 is a perspective diagram of the module assembly 100 including pluggable-modules holders 150 of FIGS. 23-26 in the horizontal and vertical configurations.

As can be seen in FIGS. 23-27, the pluggable-modules holder 150 can be semi-flexible material, such as a semi-flexible plastic. Referring to FIG. 23, the pluggable-modules holder 150 can include a mating slot 153 adjacent each holder port 154. The walls 163 positioned between the holder ports 154 can include legs 164 extending therefrom that can act as clips to hold a side of at least one of the body 132 and head 134 of the pluggable-modules 130. The legs 164 can be positioned on each of the walls 163, can extend from every other wall 163 in both directions, can extend from each wall 163 in the same direction, and the like.

Referring to FIGS. 23-27, the pluggable-modules holder 150 can be oriented in a horizontal or vertical configuration. Further, the pluggable-modules holder 150 can be positioned to span along a length of the rack-mounted unit 120 or can span transverse to a length of multiple rack-mounted units 120 to engage pluggable-modules 130 mated with multiple rack-mounted units 120.

As can be seen in FIG. 24, the pluggable-modules holder 150 can include gaps 159 between some of the holder ports 154. The gaps 159 can be sized to account for the spacing between unit ports 122 of adjacent rack-mounted units 120

Any of the assembly methods described above can be used while assembling the module assembly 100. Further, the pluggable-modules 130 can be partially inserted into one or more rack-mounted units 120, after which each pluggable-module 130 is pushed through a mating slot 153 and into a holder port of the pluggable-modules holder 150 for final seating. The pluggable-modules holder 150 can be configured such that the pluggable-modules holder 150 does not interfere with the pull-tabs 139 and the cables 139 during assembly.

In embodiments, the pluggable-modules holder 150 can be configured to remove heat from the module assembly 100, such as being configured as a heat sink or a liquid cooled system. Furthermore, the pluggable-modules holder 150 can include a light-emitting diode display or a light pipe from the rack-mounted unit 120 that can identify individual pluggable-modules 130.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A pluggable-modules holder for a plurality of pluggable-modules, the pluggable-modules holder comprising:
   a holder body;
   a plurality of holder ports, each of the holder ports being positioned along the holder body and sized to hold a portion of a respective pluggable-module; and
   electrical connectors for relaying at least one of control signals and power from one or more of a rack-mounted unit and a fan module.

2. The pluggable-modules holder of claim 1, wherein the holder body is configured to connect to a rack-mounted unit, directly or indirectly, before or after the plurality of pluggable-modules are inserted into the plurality of holder ports.

3. The pluggable-modules holder of claim 1, further comprising one or more retention features that restrain the plurality of pluggable-modules in at least a removal direction of the plurality of pluggable-modules when inserted into the plurality of holder ports, the one or more retention features including at least an assembly of a retention rod extending across a length of the pluggable-modules holder, retention arms extending from the retention rod, and a retention switch that moves the retention rods and retention arms into a retention position such that the retention arms overlap with the plurality of holder ports.

4. The pluggable-modules holder of claim 1, wherein each of the holder ports is shaped to hold a portion of a respective body of the respective pluggable-module.

5. The pluggable-modules holder of claim 3, wherein each of the holder ports is further shaped to hold at least a portion of a respective head of the respective pluggable-module.

6. The pluggable-modules holder of claim 1, further comprising an alignment feature including at least one of a rod and a bore that mates with a corresponding feature of a rack-mounted unit.

7. The pluggable-modules holder of claim 1, further comprising a plurality of cooling holes extending through the holder body.

8. The pluggable-modules holder of claim 1, wherein the plurality of holder ports are spaced such that the pluggable-modules holder is configured to hold pluggable-modules associated with multiple rack-mounted units received in a carrier.

9. A module assembly comprising:
   a plurality of pluggable-modules, each pluggable module including a pluggable transceiver;
   a rack-mounted unit including a plurality of unit ports that receive the plurality of pluggable-modules; a pluggable-modules holder including a holder body and a plurality of holder ports, each of the holder ports being positioned along the holder body, positioned in the holder body to align with a respective unit port, and sized to hold a portion of a respective pluggable-module, the pluggable-modules holder comprising electrical connectors for relaying at least one of control signals and power from one or more of the rack-mounted unit and a fan module associated with the module assembly.

10. The module assembly of claim 9, wherein the holder body is configured to connect to the rack-mounted unit, directly or indirectly, before or after the plurality of pluggable-modules are inserted into the plurality of holder ports.

11. The module assembly of claim 9, further comprising alignment features including a rod and a bore that align the pluggable-modules holder relative to the rack-mounted unit to align the plurality of holder ports with the plurality of unit ports.

12. The module assembly of claim 9, wherein the pluggable-modules holder further comprises one or more retention features that restrain the plurality of pluggable-modules in at least a removal direction of the plurality of pluggable-modules when inserted into the plurality of holder ports, the one or more retention features including at least an assembly of a retention rod extending across a length of the pluggable-modules holder, retention arms extending from the retention rod, and a retention switch that moves the retention rods and retention arms into a retention position such that the retention arms overlap with the plurality of holder ports.

13. The module assembly of claim 9, wherein the pluggable-modules holder further comprises cooling holes extending through the holder body such that cooling air blown by the fan module passes therethrough.

14. A method for assembling a module assembly, comprising:
providing a pluggable-modules holder comprising a holder body, and a plurality of holder ports, each of the holder ports being positioned along the holder body and sized to hold a portion of a respective pluggable-module the pluggable-modules holder comprising electrical connectors for relaying at least one of control signals and power from one or more of the rack-mounted unit and a fan module;
inserting a plurality of pluggable-modules into the plurality of holder ports such that each of the plurality of pluggable-modules is received by a respective holder port; and
connecting the pluggable-modules holder, directly or indirectly, to a rack-mounted unit such that the plurality of holder ports each align with a respective one of a plurality of unit ports of the rack-mounted unit,
wherein each of the plurality of pluggable-modules mate with a respective unit port.

15. The method of claim 14, wherein the pluggable-modules holder is connected to the rack-mounted unit before the plurality of pluggable-modules are inserted into the plurality of holder ports.

16. The method of claim 14, wherein the pluggable-modules holder is connected to the rack-mounted unit after the plurality of pluggable-modules are inserted into the plurality of holder ports such that the plurality of pluggable-modules mate with the plurality of unit ports simultaneously while the pluggable-modules holder is being connected to the rack-mounted unit.

17. The method of claim 14, wherein the pluggable-modules holder is connected to the rack-mounted unit via a carrier.

18. The method of claim 14, wherein the pluggable-modules holder is connected to a rack prior to being connected to the rack-mounted unit such that the pluggable-modules holder is a backplane for an assembly of the pluggable-modules holder, the rack-mounted unit, and the pluggable-modules.

* * * * *